(12) United States Patent
Hardy et al.

(10) Patent No.: US 7,752,279 B2
(45) Date of Patent: Jul. 6, 2010

(54) SYSTEM FOR FACILITATING THREAD-BASED MESSAGE PRIORITIZATION

(75) Inventors: Michael Thomas Hardy, Waterloo (CA); Piotr Konrad Tysowski, Waterloo (CA); Atif Khan, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 473 days.

(21) Appl. No.: 11/754,542

(22) Filed: May 29, 2007

(65) Prior Publication Data

US 2008/0301250 A1    Dec. 4, 2008

(51) Int. Cl.
G06F 15/16 (2006.01)
(52) U.S. Cl. .................................. 709/207; 709/206
(58) Field of Classification Search .................. 709/206, 709/207, 223; 379/88.13; 707/3; 719/313; 713/171
See application file for complete search history.

(56) References Cited

U.S. PATENT DOCUMENTS

| 2005/0204009 A1* | 9/2005 | Hazarika et al. ............ 709/206 |
| 2006/0083358 A1* | 4/2006 | Fong et al. ............... 379/88.13 |
| 2007/0038610 A1* | 2/2007 | Omoigui ....................... 707/3 |
| 2007/0162582 A1* | 7/2007 | Belali et al. ................. 709/223 |
| 2007/0179945 A1* | 8/2007 | Marston et al. ................ 707/5 |
| 2007/0288932 A1* | 12/2007 | Horvitz et al. ............... 719/313 |
| 2008/0086640 A1* | 4/2008 | Voss et al. ................... 713/171 |
| 2008/0235335 A1* | 9/2008 | Hintermeister et al. ....... 709/206 |

FOREIGN PATENT DOCUMENTS

| EP | 1 718 015 A1 | 11/2006 |
| WO | WO 03/058464 A1 | 7/2003 |
| WO | WO 2007/040648 A1 | 4/2007 |

OTHER PUBLICATIONS

Lewis, Michael, Designing for Human-Agent Interaction, URL: http://usl.sis.pitt.edu/ulab/pubs/aaaipap/pdf.
Skinner, James M., Multi-Agent Systems and Mixed-Initiative Intelligence URL:http://www.csc.com/aboutus/lef/mds67_off/uploads/skinner_mixed_initiative_agents.pdf.

* cited by examiner

Primary Examiner—Le Luu

(57) ABSTRACT

To perform thread-based message prioritization, metadata may be extracted from a received electronic message. Based on the extracted message metadata and accumulated metadata extracted from previously received messages, a message thread to which the received electronic message belongs may be identified. Based on a set of thread priority assessment criteria, a priority level for the message thread may be determined. At least part of the message thread may be processed according to the priority level. The processing may be altering a notification behavior of an electronic messaging client for electronic messages of the message thread. Thread priority assessment may be based on user-configurable criteria that may be set via a graphical user interface. Message thread identification may also be based on user-configurable criteria that may be set via a graphical user interface.

25 Claims, 7 Drawing Sheets

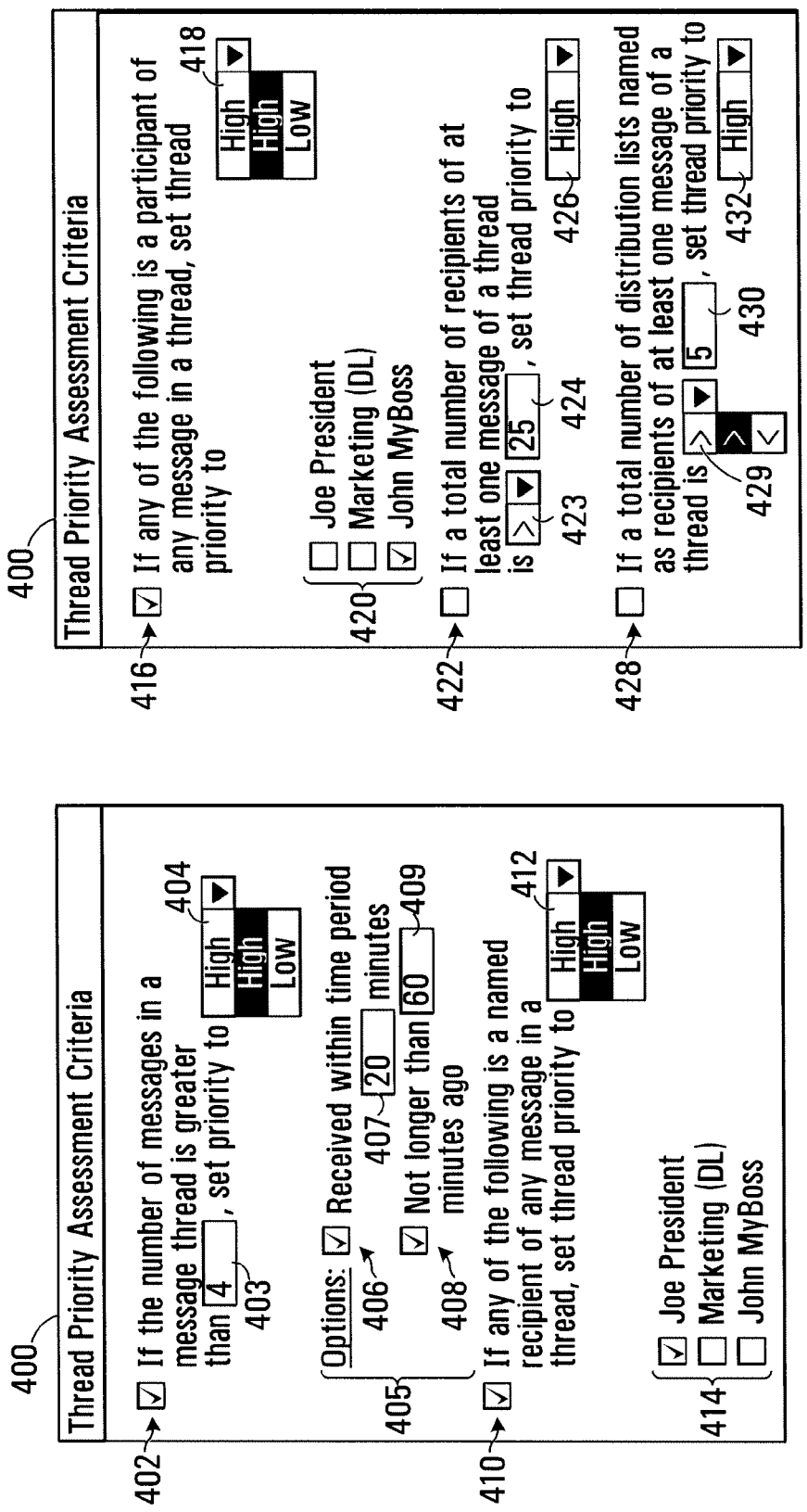

SYSTEM FOR FACILITATING THREAD-BASED MESSAGE PRIORITIZATION

FIELD OF TECHNOLOGY

The present disclosure pertains to electronic messages such as electronic mail (email) messages, short message service (SMS) messages, multimedia message service (MMS) messages, or peer-to-peer messages and more particularly to the thread-based prioritization of such messages.

BACKGROUND

The practice of defining rules or "filters" that are automatically applied by an email client or server in order to determine the priority of a received email message is known. Typically, filter criteria are based on information extracted from the received email message, such as: the identity of the message sender; the identity of one or more message recipients; the content of subject line of the message; the email importance flag setting; or combinations of these. When a received email message meets specified filter criteria, the email client or server automatically assigns a high priority (or a low priority, depending upon the filter settings) to the message. The notification behavior of the email client in respect of the message may be altered from a standard notification behavior in order to reflect this priority. For example, the appearance of the received message in a message list may be changed, e.g. by using bold, differently colored, or differently sized text than is ordinarily used to represent the message, or by applying different audio or vibration notifications depending upon message priority. For messages that do not meet the specified criteria, a standard priority may be assigned to the message, and standard notification may be performed.

Unfortunately, when the above practice is adopted, a message may disadvantageously be treated as a standard priority message even if contextual factors beyond the message itself, such as the high priority of a previous message to which the message is a response, suggest that the message should actually be treated as a high priority message. This may result in a mistaken user perception that an email message is unimportant when it is not. Conversely, it is also possible for a message to be treated as a high priority message when conventional factors suggest it should actually be treated as a standard or low priority message. Generally, the priority that is assigned to a message may not truly reflect its actual priority. This problem may also occur for other types of electronic messages, including SMS messages, MMS messages or others. A solution which mitigates or obviates this problem would be desirable.

BRIEF DESCRIPTION OF DRAWINGS

In the figures which illustrate example embodiments:

FIGS. 4A-4C illustrate a graphical user interface used to configure thread priority assessment criteria within the system of FIG. 1.

DETAILED DESCRIPTION

Figure 1:
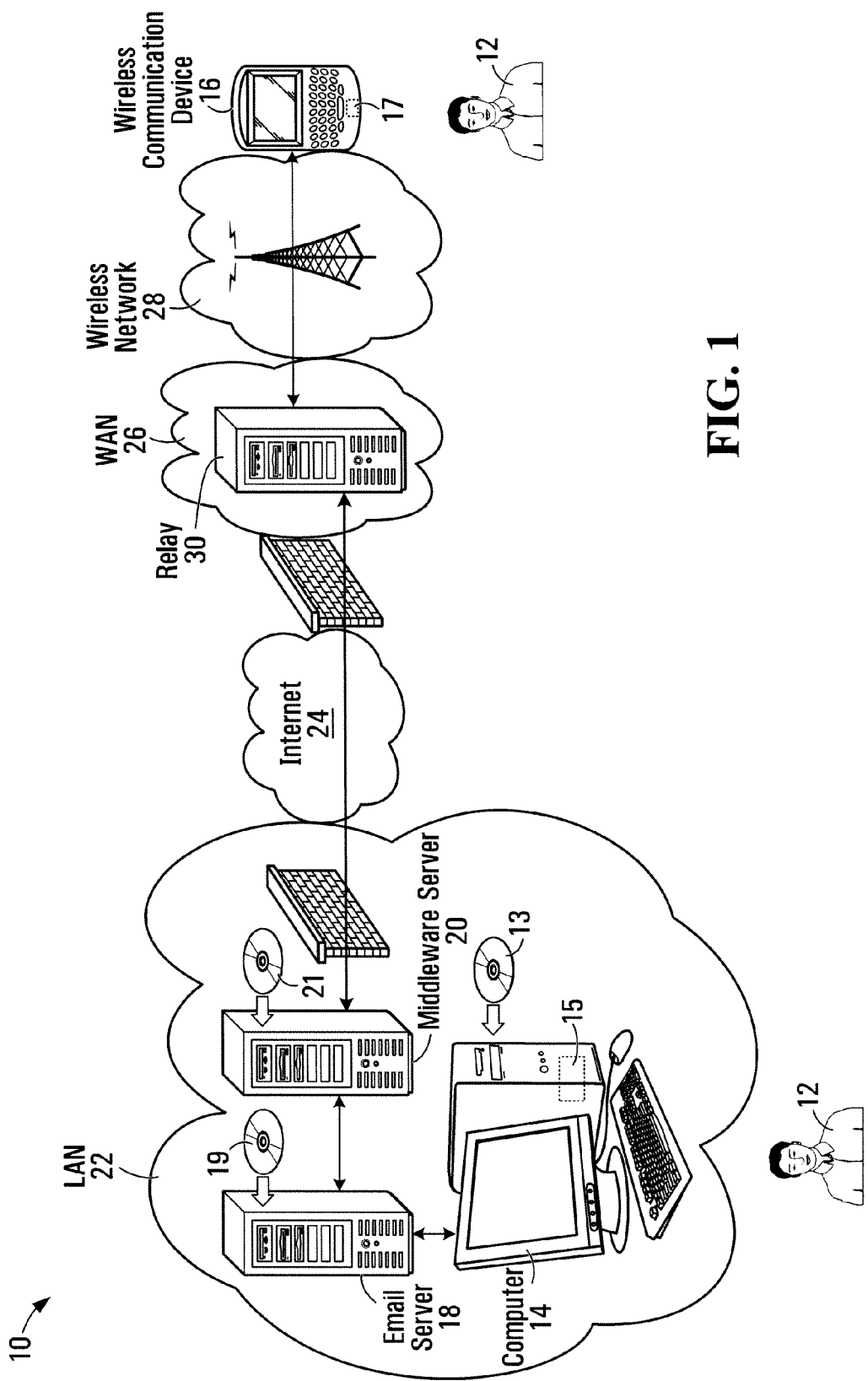
FIG. 1 is a schematic diagram of an exemplary email system.

In one aspect of the below described embodiment, there is provided a computing device comprising: a processor; and memory storing executable instructions which, upon execution by the processor, cause the computing device to: receive an electronic message; identify a message thread to which the received electronic message belongs; based on a set of thread priority assessment criteria and in view of the receiving, change a priority level for the message thread; and process at least part of the message thread according to the changed priority level.

In another aspect of the below described embodiment, there is provided a computing device comprising: a processor; and memory storing executable instructions which, upon execution by the processor, cause the computing device to: display a graphical user interface for configuring message thread identification criteria, the criteria for use in conjunction with metadata extracted from a received electronic message and accumulated metadata extracted from previously received electronic messages for identifying a message thread to which the received electronic message belongs.

In another aspect of the below described embodiment, there is provided a computer-implemented method comprising: displaying a graphical user interface for configuring message thread priority assessment criteria, the criteria for use in conjunction with information regarding a message thread comprised of a plurality of electronic messages for determining a priority level of the message thread.

In another aspect of the below described embodiment, there is provided a machine-readable medium containing executable instructions that, when executed by a processor in a computing device, cause the computing device to: receive an electronic message; identify a message thread to which the received electronic message belongs; based on a set of thread priority assessment criteria and in view of said receiving, change a priority level for the message thread; and process at least part of the message thread according to the priority level, wherein said processing of said at least part of the message thread comprises: altering a notification behavior of an electronic messaging client, executing at said computing device, for previously received electronic messages of said message thread; or assigning said changed priority level to the received electronic message and forwarding said received electronic message and assigned priority level to a remote computing device for processing in accordance with said priority.

In another aspect of the below described embodiment, there is provided a machine-readable medium containing executable instructions that, when executed by a processor in a computing device, cause the computing device to display a graphical user interface for configuring message thread identification criteria, the criteria for use in conjunction with metadata extracted from a received electronic message and accumulated metadata extracted from previously received electronic messages for identifying a message thread to which the received electronic message belongs.

In another aspect of the below described embodiment, there is provided a machine-readable medium containing executable instructions that, when executed by a processor in a computing device, cause the computing device to display a graphical user interface for configuring message thread priority assessment criteria, the criteria for use in conjunction with information regarding a message thread comprised of a plurality of electronic messages for determining a priority level of the message thread.

Referring to FIG. 1, an exemplary email system 10 that allows a user 12 to access email messages from a desktop computer 14 or a wireless communication device 16 is shown. The system 10 includes an email server 18 and a middleware server 20 which are interconnected to each other and to computer 14 by way of a local area network (LAN) 22. The system 10 also includes the public Internet 24, a wide area network (WAN) 26, and a wireless network 28.

Computer 14 is a conventional network-enabled computer, such as a Intel® or AMD™ processor-based desktop personal computer or laptop computer having a display, such as a liquid crystal display, which communicates with email server 18 over LAN 22. The computer 14 executes an email client software application 15 ("email client 15") which is stored in memory of the computer 14 (not expressly illustrated) and which permits the user 12 to access and monitor his email account maintained at email server 18. The email client 15 may be a dedicated email client, such as the commercially available Eudora™ application, or a component of an overall personal information management (PIM) software application, such as Microsoft® Outlook® for example. Many other examples of email clients are known in the art. The email client 15 comprises executable instructions and may be loaded from a machine-readable medium 13 (e.g. an optical disk or magnetic storage medium) into volatile or non-volatile memory of computer 14 prior to its execution by computer 14.

Wireless communication device 16 is a two-way paging device (a form of computing device) having a processor in communication with memory storing a mobile email client software application (or simply "mobile email client") 17. Mobile email client 17 is a computer program that permits a user 12 to access and monitor the email account maintained at email server 18, which is the same account that is accessible by way of email client 15 at computer 14. Device 16 has an input device (a keyboard), an output device (a liquid crystal display), and a speaker (not expressly shown), along with various other conventional components. The email client 17 may be downloaded from a machine-readable medium (not expressly shown) to the wireless communication device 16 via wireless network 28 by way of an over-the-air download.

Email server 18 is a conventional email server capable of maintaining an email account for user 12 and other users. Email server 18 may be a dedicated email server or may be a server which provides email capability as part of a collaboration software package, such as Microsoft® Exchange Server, Novell® Groupwise® or Lotus® Notes for example. Email messages destined for user 12 are received at email server 18 and are then forwarded to computer 14 and wireless communication device 16 for access by the user 12. The software which governs the operation of email server 18 may be loaded from a machine-readable medium 19 into volatile or non-volatile memory of server 18 for execution by a processor of server 18.

Middleware server 20 supports the automatic delivery of email messages destined for user 12 to wireless communication device 16 by way of the "push" content delivery model. In essence, the role of middleware server 20 is to monitor the email account of user 12 for new messages and, upon the detection of a new message at the server 20, to forward that message to wireless communication device 16 by way of the Internet 24, WAN 26, and wireless network 28. Middleware server 20 may be required to encrypt and compress messages and perform various other tasks to fulfill this role. These tasks are well understood in the art and are not a focus of the present description. The types of messages forwarded to device 16 by middleware server 20 may include messages other than email messages, such as instant messages for example. The software which governs the operation of middleware server 20 may be loaded from a machine-readable medium 21 into volatile or non-volatile memory of middleware server 21 for execution by a processor of server 20.

Wide area network 26 hosts a relay 30 whose purpose is to store messages destined for user 12 while wireless communication device 16 is inaccessible (e.g. powered down or out of communication range of wireless network 28) and to "push" the email messages to the device 16 once has become accessible. Relay 30 maintains information regarding a current network 28 with which the device 16 is communicating for this purpose. The identity of the network 28 may change over time as the wireless communication device 16 moves between geographical areas.

Wireless network 28 is a mobile data communication network, such as the Mobitex™, DataTAC™ or General Packet Radio Service (GPRS) network, which supports data communication between the relay 30 and the wireless communication device 16. Wireless network 28 may be designed to operate with any of a variety of voice communication networks, such as Advanced Mobile Phone Service (AMPS), Time Division Multiple Access (TDMA), Code Division Multiple Access (CDMA), Personal Communication Services (PCS), Global System for Mobile communication (GSM), third generation (3G) wireless or Universal Mobile Telecommunications Standard (UMTS) for example, to support voice communications at the wireless communication device 16. The wireless network 28 effects a wireless connection between email server 18 and wireless communication device 16. The wireless network 28 could alternatively be an IEEE 802.11 compliant ("WiFi") wireless network.

Figure 2:
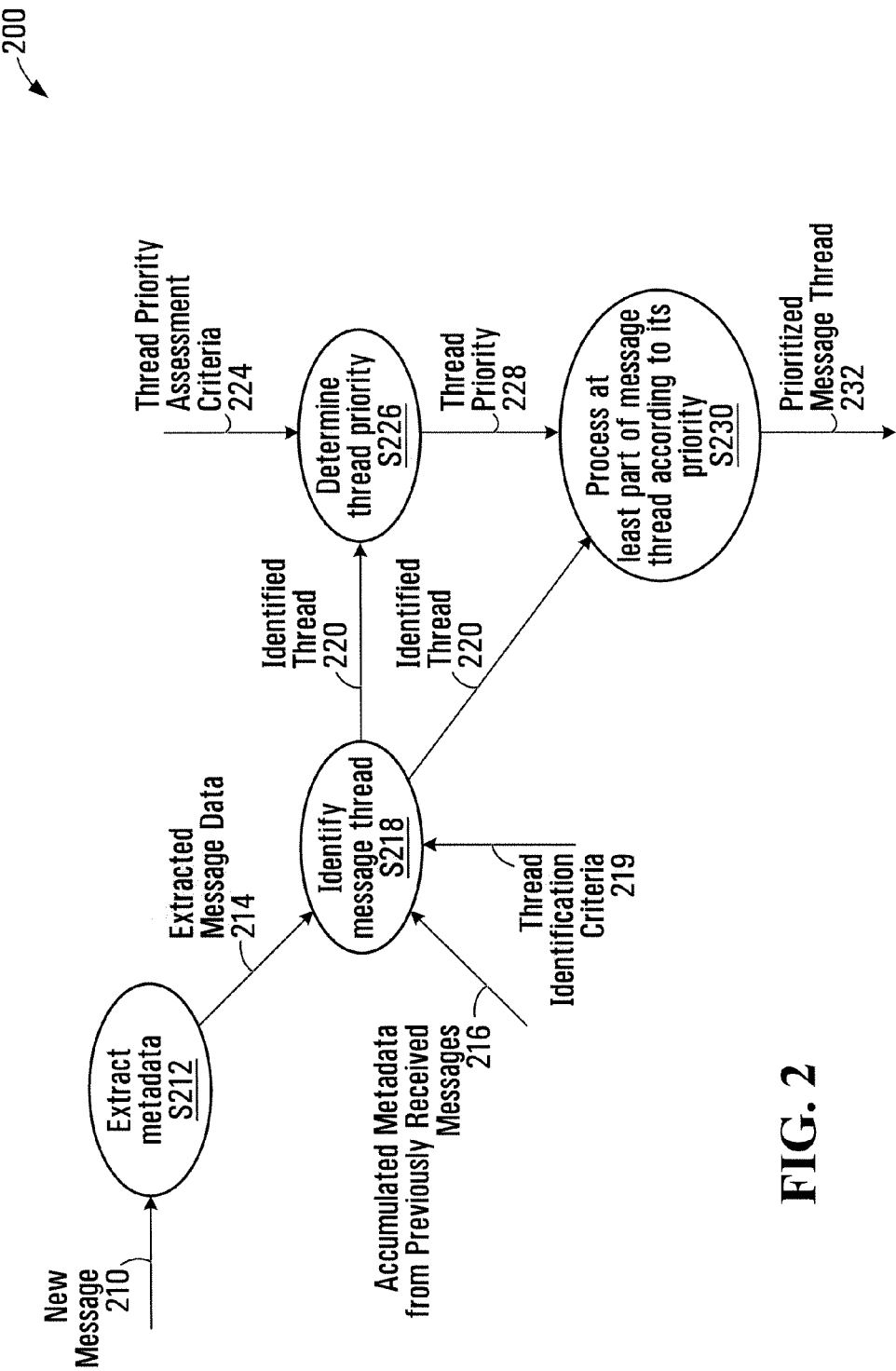
FIG. 2 is a data flow diagram illustrating operation of a component of the system of FIG. 1.

Operation of the present embodiment is illustrated in FIG. 2. A data flow diagram 200 illustrates the thread-based message prioritization approach that is effected at each of email client 15 and email client 17 (generically referred to as the "email client"). However, as will become apparent, the approach may alternatively be effected in various other components of the system 10, such as email server 18 or middleware server 20 for example, in alternative embodiments.

Initially, when a new message 210 is received, certain metadata is extracted (S212) from the message. The extracted message metadata 214 may include, for example, the time at which the message was sent, the time at which the message was received, the subject line of the message, the body of the message, the identity of the sender of the message, the identity of all recipients of the message (possibly including distribution lists comprising multiple addresses), and an identifier of a previous email message in response to which the new message 210 was sent. The precise metadata that is extracted may depend, at least in part, on the currently operative thread identification criteria 219 and thread priority assessment criteria 228 (both described below). For example, if an operative thread identification criterion requires a subject line of a newly received message to be compared with a subject line of previously received messages in order to determine whether the new message is responsive to any of the previously received messages, then the extracted metadata 214 may include subject line content. Extraction of the metadata may be achieved through parsing of the message for example.

Thereafter, the extracted message metadata 214 is used in combination with accumulated metadata 216 from previously received messages to identify a message thread (S218) to which the new message 210 belongs. For clarity, the term "message thread" refers to an original message and a set of responses to the original message, as well as any responses to those responses, any third-order responses, and so forth. The original message may be considered to be a root node of a tree; each response to that original message may be considered to be a child of that root node; each response to a response may be considered to be a grandchild of the root node; and so forth. Using this convention, any descendent node of the root node (i.e. any response message that is "traceable" to the original message) is considered to be part of the message thread. Thus, identifying the message thread involves determining that the received electronic message is responsive to a previously received message of the message thread, be it an original message or otherwise. A response is typically generated by pressing a "reply" button in an email client. The previously accumulated message metadata 216 may be an amalgamation of metadata previously extracted from earlier messages as the messages were received. The accumulated metadata 216 may be maintained in a conventional database to facilitate searching with a database engine, using a query language such as SQL for example, or in some other type of data store.

Thread identification (S218) involves determining whether or not new message 210 is a response to an original message of the thread or another message of the thread, as described above. As will be appreciated, the purpose of identifying the message thread is so that the priority of the received message may be assessed not in isolation, but in the context of its message thread. That is, the determination of message priority will not be based exclusively on the message itself, but will also be based on the priority of the thread to which it belongs.

Because the determination of whether or not a message constitutes a "response" to an earlier message could be performed in various ways, the present embodiment employs a configurable set of thread identification criteria 219 which governs this determination and thus controls thread identification. These thread identification criteria 219 may be configured by user 12 via a graphical user interface (GUI) 300 shown in FIG. 3. In the present embodiment, GUI 300 is presented to the user by the component of system 10 which applies the criteria 219 (e.g. by email client 15 or at computer 14 or email client 17 of FIG. 1).

Figure 3:
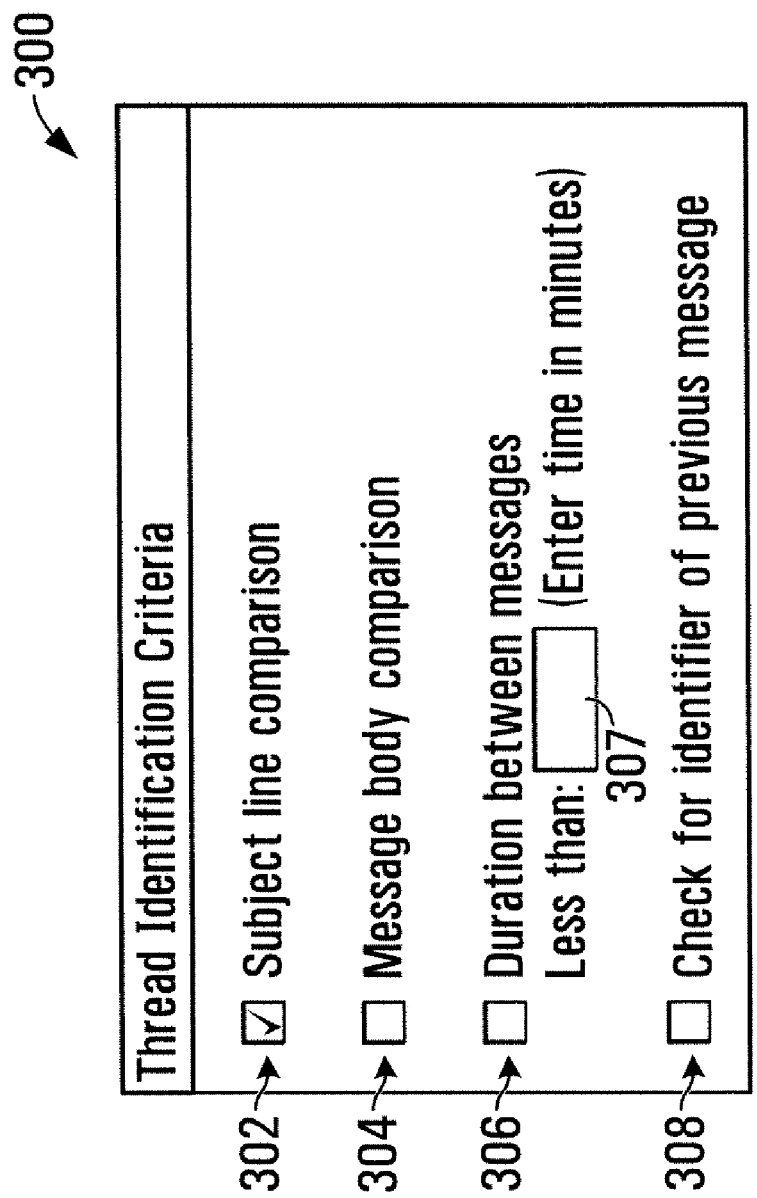
FIG. 3 illustrates a graphical user interface used to configure message thread identification criteria within the system of FIG. 1.

As illustrated in FIG. 3, GUI 300 contains four individually selectable checkboxes 302, 304, 306 and 308. Each checkbox represents a single thread identification criterion which may be selected by the user 12 individually or in conjunction with one or more other thread identification criteria.

Selection of the first checkbox 302 of FIG. 3 configures the email client to use subject line content to identify message threads. The exact manner in which subject line content is used to identify message threads may vary from embodiment to embodiment. For example, if the subject line of an earlier message reads "status report", then one embodiment may deem any subsequent messages whose subject line includes that text in its subject line (e.g. "re: status report" or "fwd: status report") to be responsive to the earlier message. Another embodiment may deem any subsequent messages whose subject line includes a portion of that text, a variation of that text or a misspelling of that text (e.g. "re: report", "fwd: status rpt.", or "my views on the stattus repor") to also be responsive to the earlier message.

Selection of the second checkbox 304 of FIG. 3 configures the email client to use message content to identify message threads. For example, messages that echo at least a portion of a body of an earlier message may be deemed responsive to the earlier message. Each line of the echoed message body may be identifiable by a preceding ">" character, although this is neither required nor always true. Again, the exact manner in which message content is used to identify message threads may vary from embodiment to embodiment. For example, the minimum number of characters of the message body of the earlier message that must be copied for the latter message to be deemed responsive thereto may differ from embodiment to embodiment or may be user-configurable.

Selection of the third checkbox 306 of FIG. 3 configures the email client to use duration between messages to identify message threads. This particular thread identification criterion may not be preferred for use in messaging systems in which the amount of time between messages of a single thread can be significant (e.g. on the order of days or weeks), as is often the case for, say, email messages. Rather, this criterion may be desirable for use in messaging systems, such as instant messaging systems or other presence-based messaging systems, wherein the messages of a thread are typically chronologically clustered in a "burst", with each message of the thread being sent within a relatively short duration D1 (e.g. on the order of minutes) of an earlier message of that thread. User selection of this criterion through checking of checkbox 306 may be partly motivated by the fact that other, perhaps more reliable thread identification criteria are unavailable for the message system of the embodiment in question. For example, since instant messages have no subject lines per se and do not routinely echo the body of a previous message to which the message is a response, the selection of checkboxes 302 and 304 may not be possible in an instant messaging system embodiment (e.g. those checkboxes may simply not be present in GUI 300 or may be "greyed out" or "ghosted" in such embodiments).

By selecting checkbox 306, the user stipulates that receipt of a message within a relatively short duration D1 (e.g. 20 minutes) of an earlier message indicates that the latter message is responsive to the earlier message. Duration D1 is configurable by the user via edit box 307 in the exemplary GUI 300 of FIG. 3. It is noted that the user may be required to accept the occasional unreliability of this criterion, in the sense that messages may sometimes be included in a thread that should not be included, and vice-versa. This is due to the fact that temporal proximity of messages is not always an accurate indicator of thread membership. It may be sufficient for the purposes of the user that the thread identification be "usually correct". This criterion could be paired with other thread identification criteria, such as recipient identity (not expressly illustrated in FIG. 3). For example, when a message is received from person A less than duration D1 from the time at which an earlier message was received from person A, both messages could be deemed to be part of the same thread.

Selection of the fourth checkbox 308 of FIG. 3 configures the email client to use unique message identifiers associated with messages to identify message threads. For example, in one embodiment, email client 17 may be the system component that applies the thread identification criteria that are set by way of graphical user interface 300. By conventional operational of the middleware server 20 of this "push" email system, each email message passed to wireless communication device 16 may be assigned a unique identifier by the middleware server 20. This unique identifier is not necessarily visible to the user, but rather may be packaged within header information associated with the message. If the email message is responsive to an earlier message, the message header may additionally contain a unique identifier of the earlier message. In such an embodiment, selection of the fourth checkbox 308 configures email client 17 to examine the header of each incoming message for such references to earlier unique message IDs, and to use this as a basis for identifying message threads. In other embodiments, unique message identifiers may be differently assigned or packaged but may nevertheless be usable for this purpose.

By changing the configurable thread identification criteria 219 via GUI 300, the user 12 may configure the system 10 to identify threads in various ways depending upon the requirements of the user 12 at that time. This may even be done while the email system 10 is executing, such that the grouping of existing messages in one's "inbox" into threads (or exclusion from threads) may dynamically change by virtue of updated thread identification criteria 219. When multiple thread identification criteria are selected, the user may be able to configure whether the multiple criteria are logically conjunctive (i.e. each operative criterion must be met for a thread to be identified), disjunctive (i.e. meeting any operative criterion is sufficient for a thread to be identified), or a combination. Alternatively, the conjunctve or disjunctive relationship between criteria may be "hard-coded". In some embodiments, each criterion could even be assigned a different weight, for greater precision. Alternatively, the criteria 219 may not be user-configurable in some embodiments. Moreover, some embodiments may employ criteria which are not expressly illustrated in the GUI 300 of FIG. 3.

Figure 4C:
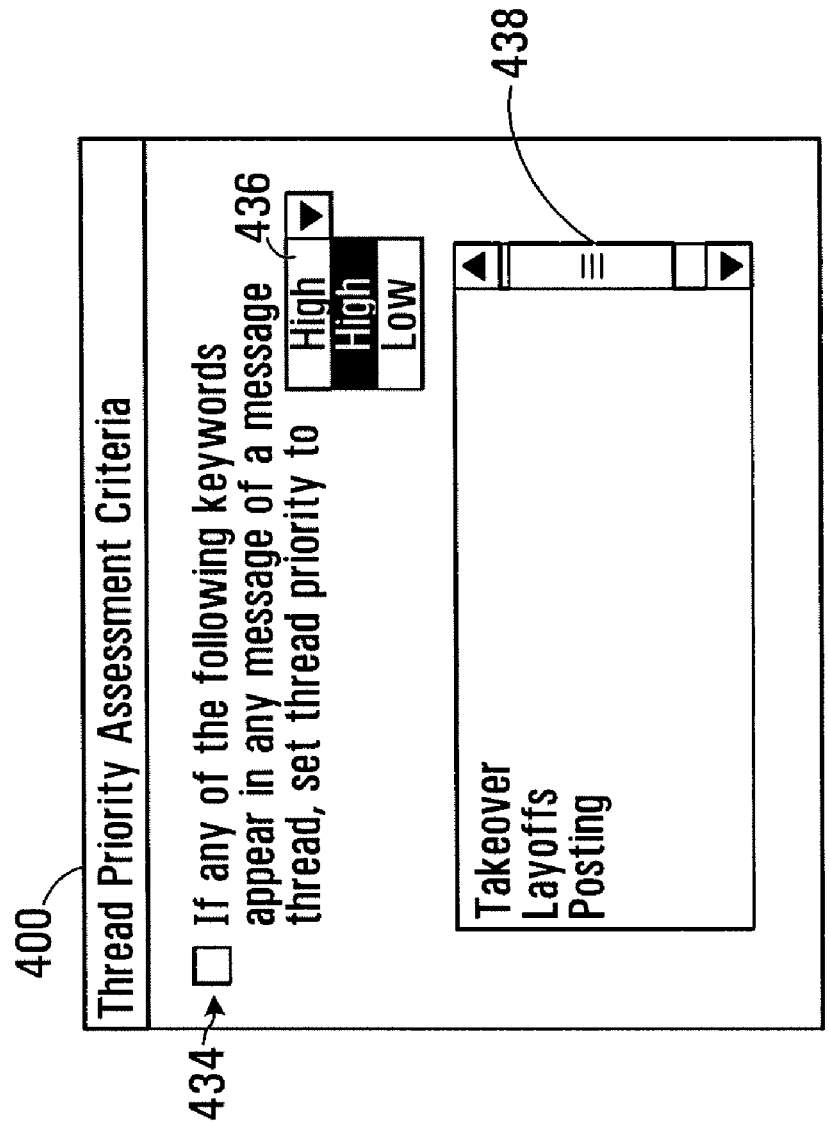

Once the message thread has been identified in S218, information regarding the identified thread 220 is used, along with a set of thread priority assessment criteria 224, to determine (S226, FIG. 2) a thread priority 228, i.e. a priority level for the thread generally. Thread priority assessment criteria 224 are the criteria by which the priority of a thread is determined by the email client (or more generically, by the system component that applies them). In the present embodiment, these criteria 224 too are configurable, by way of a GUI 400, which is illustrated in FIGS. 4A-4C. The GUI 400 may be displayed by the same system component which generates and displays the GUI 300 of FIG. 3 (i.e. email client 15 or 17).

As illustrated in FIGS. 4A-4C, exemplary GUI 400 contains six individually selectable checkboxes 402, 410, 416, 422, 428 and 434. Each checkbox represents a single thread priority assessment criterion which may be selected by a user individually or in conjunction with other priority assessment criteria.

Referring to FIG. 4A, a first screen of the exemplary GUI 400 contains checkboxes 402 and 410. Selection of the first checkbox 402 configures the email client to use the number of messages in a message thread as a criterion for setting message thread priority level. The threshold number of messages is set by the user 12 via edit box 403. The priority level that should result when the threshold number of messages in the thread is exceeded is also user-configurable by way of drop-down list 404. In some situations, the priority level will be an escalated priority level, for example when a large number of messages in the thread reflects the fact that the topic is of high importance to the thread participants. In other situations, the priority level may be a lowered priority level, for example when a large number of messages in the thread reflects the fact that the topic has already been adequately discussed.

In the present embodiment, checkbox 402 has an associated set of options 405 which only becomes available when the checkbox 402 is checked. A first option 406 comprises a checkbox which, if selected, requires the number of messages specified in edit box 403 to have been received within a time period T (e.g. within 20 minutes, indicating a "flurry" of messages) in order for the priority level specified in drop-down list 404 to be applied. The time period T is specified by the user in edit box 407. In alternative embodiments, T could be a predetermined or fixed time. The first option 406 may only become available (e.g. may only change from a "greyed out" condition to a visible condition wherein the checkbox 406 is selectable) upon selection of the checkbox 402. A second option 408 comprises a checkbox which, if selected, causes the setting of the user-specified priority level to be conditional upon the time period T not having occurred more than duration D2 since the current time (i.e. the "flurry" must have been recent). The duration D2 is specified by the user in edit box 409. In alternative embodiments, D2 could be a predetermined or fixed duration. The second option 408 may only become available when the checkbox 406 associated with the first option is selected.

Selection of the checkbox 410 of FIG. 4A configures the email client to use recipient identity as a criterion for setting message thread priority level. A set of individually selectable recipient identities 414 is automatically generated and displayed near checkbox 410. If any of the selected recipient identities 414 is a named recipient in any message of a message thread, the priority level of the thread will be set to the user-specified level which has been set via drop-down list 412. Notably, the recipient identities 414 may include distribution lists identifying multiple recipients (e.g. "marketing (DL)", wherein "DL" is an abbreviation for "distribution list").

Turning to FIG. 4B, a second screen of the exemplary GUI 400 contains checkboxes 416, 422 and 428. Selection of the checkbox 416 configures the email client to use participant identity as a criterion for setting message thread priority level. This criterion is similar to the preceding criterion, except that the party identified using checkboxes 420 must have participated in the thread (i.e. originated at least one message comprising the thread) in order for the priority level set via drop-down list 418 to be applied.

Selection of checkbox 422 configures the email client to use recipient quantity as a criterion for setting message thread priority level. If the total number of recipients of at least one message of a thread is greater than the user-specified number of 25 (set by way of edit box 424), the priority of the thread is set to high (i.e. the level specified in drop-down list 426). Drop-down list 423, also permits the user-specified priority level to be applied when the total number of recipients is less than a user-specified number. The threshold number of recipients could be predetermined or fixed in other embodiments.

A similar checkbox 428 configures the email client to use the total number of distribution lists named as recipients of at least one message of the thread as a criterion for setting message thread priority level. The threshold number of distribution lists is user-configurable by way of edit box 430, as is the logical "greater than" or "less than" operator to be used (by way of drop-down list 429) and the priority level to be applied (by way of drop-down list 432).

Referring to FIG. 4C, a third screen of the exemplary GUI 400 contains checkbox 434. Selection of checkbox 434 configures the email client to use keyword presence as a criterion for setting a thread priority level which is specified in drop-down list 436. In the illustrated example, selection of checkbox 434 causes an escalated priority level to be set for a message thread when any message of the thread contains any of the keywords specified in list 438, e.g. within its body or subject line. The keywords of list 438 may be set or changed by the user as desired.

Optionally, upon user specification of a lowered priority ("Low") in drop-down list 436, the keywords displayed in list for 38 may change to a list of keywords that are indicative of relative unimportance. That is, in addition to being able to specify keywords indicative of a message thread of high priority, the user may also be able to specify keywords indicative of a message thread of low priority. In this case, if an email message contains one keyword indicating high priority and another keyword indicating low priority, then the conflicting priority levels may be considered to "cancel" and the thread priority may be left at a standard priority level. Alternatively, one of the conflicting priorities could simply override the other.

When multiple thread priority assessment criteria are selected, the user may be able to configure whether the multiple criteria are logically conjunctive, disjunctive, or a combination. Alternatively, the conjunctive or disjunctive relationship between criteria may be "hard-coded".

Various combinations of the different thread priority assessment criteria 224 illustrated in FIGS. 4A-4C may be used, with each criterion possibly being assigned a different weight. Some embodiments may employ criteria which are not expressly illustrated in the GUI 400 of FIGS. 4A-4C. Ultimately, the thread priority 228 that is determined (at S226, FIG. 2) from the operative criteria may be higher than a standard message priority (escalated) or lower than that priority (lowered).

The thread priority 228 is then used, along with information regarding the identified thread 220, to process at least part of the message thread according to its priority (S230, FIG. 2). In the exemplary embodiment, this processing comprises displaying each message of the message thread according to its (thread-based) priority, e.g., in bold lettering or in a bright color indicative of high priority or in faint lettering or another color indicative of low priority.

Figures 5A, 5B:
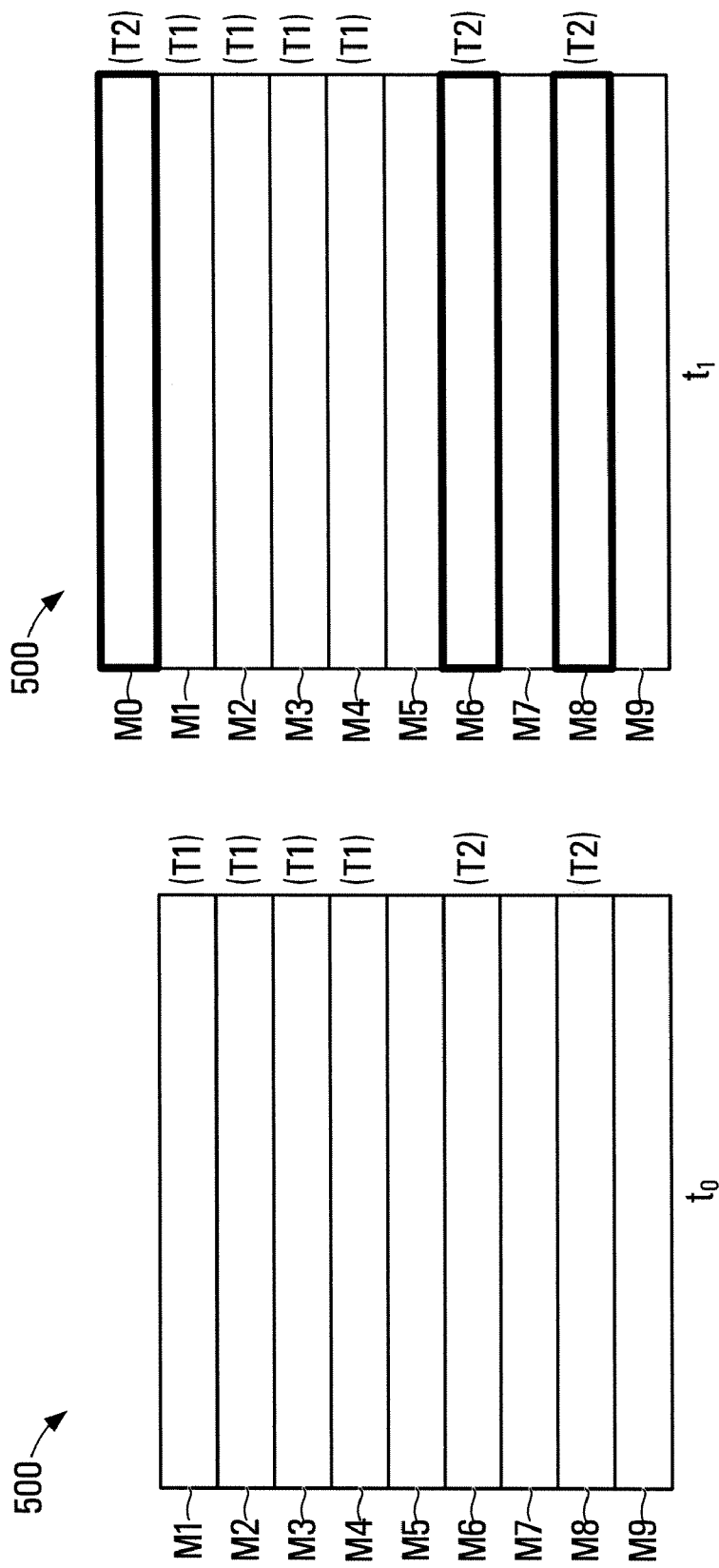
FIGS. 5A-5D schematically illustrate notification behavior for a message list which may result from the operation of FIG. 2.

FIGS. 5A-5D illustrate various scenarios of the processing performed at S230. In FIG. 5A, a message list 500 displayed by email client 15 on a display of computer 14, or by e-mail client 17 on a display of wireless communication device 16, is shown at an initial time $t_0$. The message list 500 includes nine previously messages M1-M9. Through previous application of the message thread identification criteria 219 by the relevant email client, messages M1-M4 have been deemed to form a first message thread T1, and messages M6 and M8 have been deemed to form a second message thread T2, as indicated by the labels "T1" and "T2" indicated parenthetically to the right of these messages in FIG. 5A. Despite having been identified as message threads, neither of message threads T1 or T2 have been deemed to have an elevated or lower priority. Accordingly, standard notification mechanisms are used to display all of the messages M1-M9, including the messages of these threads.

FIG. 5B illustrates the arrival of a new message M0 at the email client at time $t_1$. This arrival triggers the processing of FIG. 2, described above. It is assumed that operation at S218 assigns message M0 to message thread T2. That is, message M0 is deemed to be responsive to one of earlier messages M6 or M8. It is further assumed that the arrival of the M0 causes the priority level of thread T2 to become escalated from a standard priority to a high priority in this example. This may for example be due to the fact that a certain keyword indicative of importance forms part of the most recent message M0. In this scenario, processing at S230 causes notification behavior to be altered for all of the messages in thread T2, not just message M0. This is represented in FIG. 5B by the heavy outline around each of messages M0, M6 and M8 in message list 500. That is, the escalated priority is applied to each message of the thread upon the new message's arrival, such that the messages comprising the thread will suddenly change status all at once. This highlights the fact that new messages can affect the priority of previously received messages. In other words, the priority of each message does not become fixed upon its arrival, but rather is dynamic based on the priority level of the thread to which it belongs, which may change over time. Altered notification behavior may comprise changing the appearance of the received message in a message list, e.g. by using bold, differently colored, or differently sized text than is ordinarily used to represent the message, or changing default audio or vibration notifications.

Figure 5D:
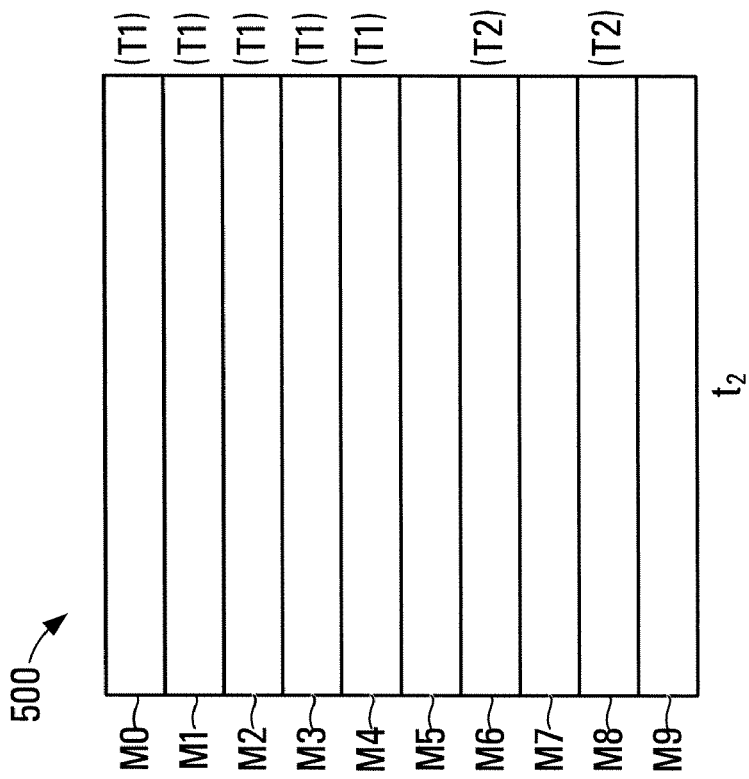
Figure 5C:
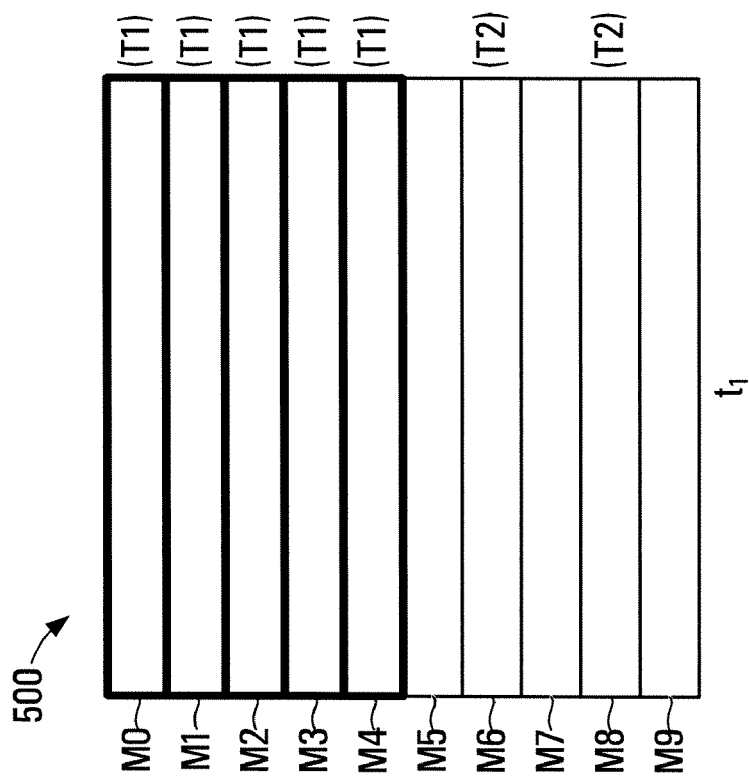

FIG. 5C illustrates a somewhat different scenario than that which is illustrated in FIG. 5C. This scenario assumes that the user 12 has previously selected (activated) the thread priority assessment criterion 402 of FIG. 4A, specifying a threshold message number of 4 in edit box 403. It further assumes that both of options 406 and 408 are selected and have values "20 minutes" and "60 minutes" within edit boxes 407 and 409 respectively. At time $t_1$, a different message M0 arrives and triggers the processing illustrated in FIG. 2. In this case, however, operation at S218 assigns message M0 to message thread T1. That is, the scenario message M0 is deemed to be responsive to one of earlier messages M1-M4. Just prior to the arrival of message M0, thread T1 had a standard priority level as shown in FIG. 5A. Assuming that all of the messages M0-M4 were received within a 20-minute period which occurred less than 60 minutes ago, the arrival of the M0, which is the fifth message in thread T1, causes criterion 402 to be met. As a result, the priority level of thread T1 becomes escalated from a standard priority to a high priority. Processing at S230 again causes notification behavior to be altered for all of the messages of the thread, not just message M0. This is represented in FIG. 5C by the heavy outline around each of messages M0-M4 in message list 500. However, if no messages are received for the next 60 minutes, the mere passage of this amount of time causes criterion 402, and in particular option 408 (FIG. 4A), to cease to be met at time $t_2$. Accordingly, email client ceases displaying messages M0-M4 as high priority messages and reverts to displaying them as standard priority messages, as shown in FIG. 5D. This again illustrates the dynamic nature of the thread-based priorization scheme of the present embodiment.

Once the operation 200 of FIG. 2 has completed for a newly received message 210, the extracted message metadata 214 from that message is combined or "merged" with the accumulated metadata 216 from previously received message, e.g. by storing the metadata 214 in the same database as the accumulated metadata 216. This is in order to prepare for re-execution of operation 200 upon the future arrival of a new message.

It is stated above that the precise metadata 214 that is extracted from a new message at S212 (FIG. 2) may depend, at least in part, on the currently operative thread identification criteria 219 and thread priority assessment criteria 224. While this may be true in some embodiments, in other embodiments the metadata 214 that is extracted from a new message may be independent of the currently operative thread identification criteria 219 and currently operative thread priority assessment criteria 224. The reason is that, because the user may decide to dynamically change the currently operative criteria 219 or 224, a system component which performs thread identification S218 and thread priority assessment S226 may need to re-examine previously received messages based on the newly operative criteria. In order to avoid the need to parse previously received messages for a second time, sufficient metadata 214 to support all of the potentially operative thread identification criteria 219 and thread priority assessment criteria 224 may be extracted from new messages upon their receipt and stored, in combination with previously accumulated metadata 216, for possible future reference. This may be done regardless of which criteria 219 and 228 are currently operative. The metadata 214 that should be extracted from newly received messages in such embodiments would be apparent to one of ordinary skill in the art based on the above description of criteria 219 and 224. However, for illustration, examples of metadata that might be tracked include the timestamp of each email message, the content of each message (e.g. body and subject line), the sender of each message, the recipients of each message including any identified distribution lists, and so forth.

In the above description, the thread-based message prioritization operation 200 is described as being effected at email client 15 or email client 17. However, as noted above, the approach could be effected in other components of the system 10, such as email server 18 or middleware server 20 for example, in alternative embodiments. The rationale for performing operation 200 at one of these components may be to relieve wireless communication device 16 from the burden of this computation, given the possibly limited processing power and limited battery life of the device. In such alternative embodiments, the GUIs 300 and 400 would likely be displayed at the email server 18 or middleware server 20 rather than at computer 14 or wireless communication device 16, and the criteria may be set by a system administrator rather than an end user 12. Moreover, the server 18 or 20 should have access to the database that is used to store accumulated metadata 216. The processing of at least part of the message thread that is done in S230 in such embodiments may consist of assigning the determined thread priority 228 to the newly received message 210 and then forwarding the received message and assigned priority to wireless communication device 16 for display in accordance with the assigned priority. In this case the output "prioritized message thread 232" of FIG. 2 may instead be an output "message with assigned priority 232". In such embodiments, the priority of a message thread at the wireless communication device 16 may be understood to be the priority of the last message in the thread. Alternatively, to avoid a situation in which previously assigned priorities of the messages displayed at the wireless communication device 16 have become "stale" due to subsequent events that have caused the thread priority to change, the priority of messages could be periodically synchronized as between server 18 or 20 and the device, much in the same way as the read/unread state of a message or the containing folder for a message are periodically synched in known push email systems.

The processing of at least part of the message thread that is done in S230 in such embodiments may also consist of selectively forwarding the email message 210 to the wireless communication device 16 based on the assigned priority. That is, whether or not the email message 210 is forwarded to the device 16 by way of the "push" system can be made to depend upon the determined priority that is assigned to the message. For example, email messages with an assigned high priority may always be forwarded to the wireless device while lower priority email messages may be retained in the user's email server account email inbox but not forwarded to the wireless communication device 16, so as to reduce possible network data service charges from cellular or wireless service providers.

As will be appreciated by those skilled in the art, modifications can be made to the above-described embodiments without departing from the essence of the invention. For example, although the above-described embodiments are implemented within an email messaging system 10, the same thread-based message prioritization approach could be implemented in messaging systems which transmit other types of electronic messages, such as SMS, MMS or peer-to-peer messages for example.

Wireless communication device 16 need not be a two-way paging device in all embodiments. Other forms of wireless communication devices, such as handheld computers, personal digital assistants, cellular telephones, or smart phone, to name but a few examples, could alternatively be used.

In some embodiments, the thread priority assessment criteria could include a criterion similar to the thread identification criterion 306 of FIG. 3, in which a duration of less than a configuration duration between messages is used to reflect a high thread priority (rather than the existence of a thread).

Some embodiments may only assign an escalated thread priority to newly arrived messages of the thread, with previously received messages of the thread being left at their original (lower) priority. The motivation for such an approach may be a desire to reduce processing power demands or to limit overall power consumption.

Other modifications will be apparent to those skilled in the art and, therefore, the invention is defined in the claims.

What is claimed is:

1. A computing device comprising:
a processor; and
memory storing executable instructions which, upon execution by said processor, cause said computing device to:
receive an electronic message;
identify a message thread to which said received electronic message belongs;
based on a set of thread priority assessment criteria and in view of said receiving, change a priority level for the message thread; and
process at least part of the message thread according to said changed priority level.

2. The computing device of claim 1 wherein said processing at least part of the message thread comprises altering a notification behavior of an electronic messaging client, executing at said computing device, for previously received electronic messages of said message thread.

3. The computing device of claim 1 wherein said processing at least part of the message thread comprises:
assigning said changed priority level to the received electronic message; and
forwarding said received electronic message and assigned priority level to a remote computing device for processing in accordance with said priority level.

4. The computing device of claim 3 wherein said forwarding is conditional upon said changed priority level.

5. The computing device of claim 1 wherein said electronic message and said previously received electronic messages comprise any of electronic mail (email) messages, short message service (SMS) messages, multimedia message service (MMS) messages, or peer-to-peer messages.

6. The computing device of claim 1 wherein said identifying said message thread comprises determining that the received electronic message is responsive to a previously received electronic message of said message thread.

7. The computing device of claim 6 wherein said determining comprises comparing a subject line of said received electronic message to a subject line of said previously received electronic message.

8. The computing device of claim 6 wherein said determining comprises ascertaining that said received electronic message contains at least a portion of a body of said previously received electronic message.

9. The computing device of claim 6 wherein said determining comprises ascertaining that a duration between a time of said receiving said electronic message and a time of receiving said previously received electronic message is less than a predetermined duration.

10. The computing device of claim 6 wherein said determining comprises ascertaining that a unique identifier associated with said previously received electronic message forms part of said received electronic message.

11. The computing device of claim 1 wherein said set of thread priority assessment criteria cause said changing the priority level for the message thread to comprise setting an escalated or lowered priority level when the number of messages in said message thread exceeds a threshold.

12. The computing device of claim 11 wherein said number is a number of messages that have been received within a predetermined time period.

13. The computing device of claim 12 wherein, when the number of messages that have been received within said predetermined time period exceeds said threshold, said setting of said escalated or lowered priority level is conditional upon said time period not having occurred more than a predetermined duration since the current time.

14. The computing device of claim 1 wherein said set of thread priority assessment criteria cause said changing the priority level for the message thread to comprise setting an escalated or lowered priority level if any message of said message thread is addressed to a predetermined recipient.

15. The computing device of claim 1 wherein said set of thread priority assessment criteria cause said changing the priority level for the message thread to comprise setting an escalated or lowered priority level if any message of said message thread is addressed to a predetermined distribution list, said distribution list identifying multiple recipients.

16. The computing device of claim 1 wherein said set of thread priority assessment criteria cause said changing the priority level for the message thread to comprise setting an escalated or lowered priority level if a total number of recipients of at least one message of said message thread exceeds a threshold.

17. The computing device of claim 1 wherein said set of thread priority assessment criteria cause said changing the priority level for the message thread to comprise setting an escalated or lowered priority level if a total number of distribution lists to which at least one message of said message thread has been sent exceeds a threshold, each distribution list identifying multiple recipients.

18. The computing device of claim 1 wherein said set of thread priority assessment criteria cause said changing the priority level for the message thread to comprise setting an escalated or lowered priority level if a particular individual has participated in said message thread.

19. The computing device of claim 1 wherein said set of thread priority assessment criteria cause said changing the priority level for the message thread to comprise setting an escalated or lowered priority level if one or more keywords appear in any portion of any message of said thread.

20. The computing device of claim 1 wherein said processing comprises applying said changed priority level to each message of the message thread.

21. A computing device comprising:
a processor; and
memory storing executable instructions which, upon execution by said processor, cause said computing device to:
display a graphical user interface for configuring message thread identification criteria, said criteria for use in conjunction with metadata extracted from a received electronic message and accumulated metadata extracted from previously received electronic messages for identifying a message thread to which said received electronic message belongs.

22. A machine-readable medium containing executable instructions that, when executed by a processor in a computing device, cause said computing device to:
receive an electronic message;
identify a message thread to which said received electronic message belongs;
based on a set of thread priority assessment criteria and in view of said receiving, change a priority level for the message thread; and
process at least part of the message thread according to said priority level, wherein said processing of said at least part of the message thread comprises:
altering a notification behavior of an electronic messaging client, executing at said computing device, for previously received electronic messages of said message thread; or
assigning said changed priority level to the received electronic message and forwarding said received electronic message and assigned priority level to a remote computing device for processing in accordance with said priority level.

23. The machine-readable medium of claim 22 wherein said processing comprises applying said changed priority level to each message of the message thread.

24. A machine-readable medium containing executable instructions that, when executed by a processor in a computing device, cause said computing device to display a graphical user interface for configuring message thread identification criteria, said criteria for use in conjunction with metadata extracted from a received electronic message and accumulated metadata extracted from previously received electronic messages for identifying a message thread to which said received electronic message belongs.

25. A machine-readable medium containing executable instructions that, when executed by a processor in a computing device, cause said computing device to display a graphical user interface for configuring message thread priority assessment criteria, said criteria for use in conjunction with information regarding a message thread comprised of a plurality of electronic messages for determining a priority level of said message thread.

* * * * *